(12) United States Patent
Girard et al.

(10) Patent No.: US 11,263,437 B2
(45) Date of Patent: Mar. 1, 2022

(54) METHOD FOR EXTRACTING A FEATURE VECTOR FROM AN INPUT IMAGE REPRESENTATIVE OF AN IRIS BY MEANS OF AN END-TO-END TRAINABLE NEURAL NETWORK

(71) Applicant: Idemia Identity & Security France, Courbevoie (FR)

(72) Inventors: Fantin Girard, Courbevoie (FR); Emine Krichen, Courbevoie (FR); Cedric Thuillier, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 0 days.

(21) Appl. No.: 16/922,423

(22) Filed: Jul. 7, 2020

(65) Prior Publication Data

US 2021/0019502 A1 Jan. 21, 2021

(30) Foreign Application Priority Data

Jul. 16, 2019 (FR) ...................... 1908000

(51) Int. Cl.
*G06K 9/00* (2006.01)
*G06T 7/11* (2017.01)
(Continued)

(52) U.S. Cl.
CPC ....... *G06K 9/00281* (2013.01); *G06K 9/0061* (2013.01); *G06K 9/00604* (2013.01);
(Continued)

(58) Field of Classification Search
None
See application file for complete search history.

(56) References Cited

U.S. PATENT DOCUMENTS

2007/0036397 A1* 2/2007 Hamza ............... G06K 9/00597
382/117
2017/0091550 A1* 3/2017 Feng ........................ G06T 7/38
(Continued)

FOREIGN PATENT DOCUMENTS

WO 2019/122168 A1 6/2019

OTHER PUBLICATIONS

Krichen, E., "Lef3a: Pupil segmentation using Viterbi search algorithm," 2012 5th IAPR International Conference on Biometrics (ICB), IEEE, dated Mar. 29, 2012, DOI:10.1109/ICB.2012.6199827, pp. 323-329.
(Continued)

*Primary Examiner* — Edward Park
(74) *Attorney, Agent, or Firm* — Womble Bond Dickinson (US) LLP (57) ABSTRACT

The present invention relates to a method for extracting a feature vector from an input image representative of an iris by means of a neural network, characterized in that it can be trained end-to-end and comprises the implementation by data-processing means of a client of steps of:
(a) Segmentation of the input image representative of the iris by means of a first subnetwork in order to obtain an iris segmentation map, a pupil segmentation map and an attention map;
(b) Extraction by a second subnetwork of the neural network of a feature vector from the normalized image representative of the iris segmented by a normalization operation, characterized in that it is derivable.

14 Claims, 6 Drawing Sheets

(51) Int. Cl.
  *G06K 9/62* (2022.01)
  *G06T 7/60* (2017.01)

(52) U.S. Cl.
  CPC .............. *G06K 9/6215* (2013.01); *G06T 7/11* (2017.01); *G06T 7/60* (2013.01); *G06T 2207/20081* (2013.01); *G06T 2207/20084* (2013.01)

(56) References Cited

U.S. PATENT DOCUMENTS

| | | | |
|---|---|---|---|
| 2017/0357879 A1 | 12/2017 | Odaibo et al. | |
| 2018/0089834 A1* | 3/2018 | Spizhevoy | G06T 7/10 |
| 2020/0356771 A1* | 11/2020 | Rozmus | G06K 9/00906 |
| 2021/0019502 A1* | 1/2021 | Girard | G06T 7/60 |

OTHER PUBLICATIONS

Correspondence from the French National Institute of Industrial Property Office (INPI—Institute National De La Propriété Industrielle) for FR1908000 dated Apr. 14, 2020; Preliminary Research Report of the French National Institute of Industrial Property Office for FR1908000 dated Apr. 6, 2020; and Written Opinion on the Patentability of the Invention issued by the French National Institute of Industrial Property Office for FR1908000.

English machine translation of Correspondence from the French National Institute of Industrial Property Office (INPI—Institute National De La Propriété Industrielle) for FR1908000 dated Apr. 14, 2020; Preliminary Research Report of the French National Institute of Industrial Property Office for FR1908000 dated Apr. 6, 2020; and Written Opinion on the Patentability of the Invention issued by the French National Institute of Industrial Property Office for FR1908000.

\* cited by examiner

METHOD FOR EXTRACTING A FEATURE VECTOR FROM AN INPUT IMAGE REPRESENTATIVE OF AN IRIS BY MEANS OF AN END-TO-END TRAINABLE NEURAL NETWORK

CROSS-REFERENCE TO RELATED APPLICATIONS

This application claims the benefit of French Patent Application No. 1908000 filed Jul. 16, 2019, the disclosure of which is herein incorporated by reference it its entirety.

GENERAL TECHNICAL FIELD

The present invention relates to the field of biometrics, and in particular proposes a method for extracting a feature vector from an input image representative of an iris by means of an end-to-end trainable neural network, as well as a learning method of the neural network.

STATE OF THE ART

Biometric authentication/identification consists of recognizing an individual on the basis of biometric traits of that individual, such as fingerprints (digital recognition), the iris or the face (facial recognition).

Conventional biometric approaches use characteristic information of the biometric trait extracted from the acquired biometry, called features, and the learning/classification is done on the basis of the comparison of these features These features are represented in the form of feature vectors, calculated from an input image. They are said to be "extracted" from the image. This feature vector extraction is a common task in the field of machine learning, in particular for computer vision. Indeed, the feature vectors make it possible to compare the images from which they have been extracted. For this purpose, a measurement of similarity or distance can be calculated between two feature vectors.

More particularly, in the case of biometric authentication/identification, the feature vectors can be used to estimate whether two images representative of a biometric trait identify the same individual.

It is proposed in the document Zhao, Z. and Kumar, A., "Towards More Accurate Iris Recognition Using Deeply Learned Spatially Corresponding Features," 2017 IEEE International Conference on Computer Vision (ICCV), Venice, 2017, pages 3829-3838.doi: 10.1109/ICCV.2017.411 a neural network for biometric authentication by iris recognition. However, such a method requires that the irises provided as the input of the iris recognition neural network first be normalized and segmented using conventional approaches. These pre-processing steps are particularly tedious, especially the segmentation, because the lack of databases large enough to allow the training of a neural network dedicated to segmentation requires the use of methods for manual annotation of iris images provided as the input of the iris recognition neural network.

BRIEF DESCRIPTION OF THE INVENTION

According to a first aspect, the present invention relates to a method for extracting a feature vector from an input image representative of an iris by means of a neural network, characterized in that it can be trained end-to-end and comprises the implementation by data-processing means of a client of steps of:

(a) Segmentation of the input image representative of the iris by means of a first subnetwork in order to obtain an iris segmentation map, a pupil segmentation map and an attention map;

(b) Extraction by a second subnetwork of the neural network of a feature vector from the normalized image representative of the iris segmented by a normalization operation, characterized in that it is derivable.

According to other advantageous and non limiting characteristics:

the normalization operation further comprises the implementation of steps of:

Multiplying the input image representative of the iris by the attention map determined during the segmentation step, said attention map making it possible to mask the information not related to the iris in the input image representative of the iris;

Estimating the centroid of the iris from the pupil segmentation map determined during the segmentation step;

Estimating the radius of the iris, respectively of the pupil, from the iris segmentation map and the pupil segmentation map, respectively, determined during the segmentation step;

Applying a polar transformation in order to represent the iris in the form of a rectangle of fixed size;

These steps being characterized in that they can be derived mathematically.

estimating the centroid of the iris comprises calculating a weighted average of the values of the pixels of the pupil segmentation map in order to obtain the coordinates of the center of the iris.

estimating the radius of the iris and the pupil, from an iris segmentation map and a pupil segmentation map, respectively, comprises calculating the area of the iris and the pupil, respectively.

the radius of the iris and the pupil varies according to the angle and is measured on the iris segmentation map and the pupil segmentation map, respectively, for a plurality of angles.

the first subnetwork is an auto-encoder network suitable for semantic segmentation.

the method comprises a prior step (a.0) of learning, by data-processing means (11) of a server (1), from a database of learning images comprising irises associated with identities, parameters of said first and second subnetworks according to an objective function of the neural network.

the prior learning step comprises calculating the objective function of the neural network, said calculation of the objective function of the neural network being carried out for a batch of images representative of an iris of the learning database comprising at least two first images representative of an iris associated with a single identity as well as at least two second images representative of an iris associated with a single identity, said identity being different from the identity associated with the two first images representative of an iris, and further comprising the implementation, for each image representative of an iris of the batch, said image representative of an iris being referred to as anchor, of steps of:

Selecting a first set of images representative of an iris comprising all the images representative of an iris of the batch associated with the same identity as that of the anchor;

Selecting a second set of images comprising all the images representative of an iris of the batch associated with identities different from that of the anchor;

Extracting feature vectors from each image of the two sets of images as well as from the anchor;

Calculating a maximum distance between the feature vector extracted from the anchor and a feature vector extracted from an image representative of an iris of the first set;

Calculating a minimum distance between the feature vector extracted from the anchor and a feature vector extracted from an image representative of an iris of the second set;

The objective function of the neural network being dependent on the maximum value, across all the possible anchors, of the difference between the maximum calculated distance for this anchor and the minimum calculated distance for this anchor.

the prior learning step comprises implementing steps of:
i. Calculating a first objective function of the neural network for a batch of images representative of an iris of the learning database;
ii. Modifying the parameters of the first subnetwork according to the first objective function of the neural network;
iii. Calculating a second objective function of the neural network for a batch of images representative of an iris of the learning database;
iv. Modifying the parameters of the second subnetwork according to the second objective function of the neural network;
v. Repeating steps i. to iv. for a predetermined number of iterations.

the prior learning step comprises calculating the objective function of the neural network, said calculation of the objective function of the neural network being carried out for a batch of images representative of an iris of the learning database comprising at least two first images representative of an iris associated with a single identity as well as at least two second images representative of an iris associated with a single identity, said identity being different from the identity associated with the two first images representative of an iris, and further comprising the implementation, for each image representative of an iris of the batch, said image representative of an iris being referred to as anchor, of steps of:

Selecting a first set of images representative of an iris comprising all the images representative of an iris of the batch associated with the same identity as that of the anchor;

Selecting a second set of images comprising all the images representative of an iris of the batch associated with identities different from that of the anchor;

Extracting feature vectors from each image of the two sets of images as well as from the anchor;

Calculating a maximum distance between the feature vector extracted from the anchor and a feature vector extracted from an image representative of an iris of the first set;

Calculating a minimum distance between the feature vector extracted from the anchor and a feature vector extracted from an image representative of an iris of the second set;

The objective function of the neural network being dependent on the value of the sum, over all the possible anchors, of the difference between the maximum calculated distance for this anchor and the minimum calculated distance for this anchor.

According to a second and third aspect, the invention proposes a computer program product comprising code instructions for executing a method according to the first aspect of extracting a feature vector from an input image representative of an iris by means of a first end-to-end trainable neural network; and a storage means readable by computer equipment on which a computer program product comprising code instructions for executing a method according to the first aspect of extracting a feature vector from an input image representative of an iris by means of an end-to-end trainable neural network.

DESCRIPTION OF THE FIGURES

Other characteristics and advantages of the present invention will appear upon reading the following description of a preferred embodiment. This description will be given with reference to the attached drawings in which.

DETAILED DESCRIPTION

Architecture

According to two additional aspects of the invention, the following is proposed:

A method for extracting a feature vector from an input image representative of an iris by means of an end-to-end trainable neural network;

A method for end-to-end learning of parameters of the neural network.

Figure 1:
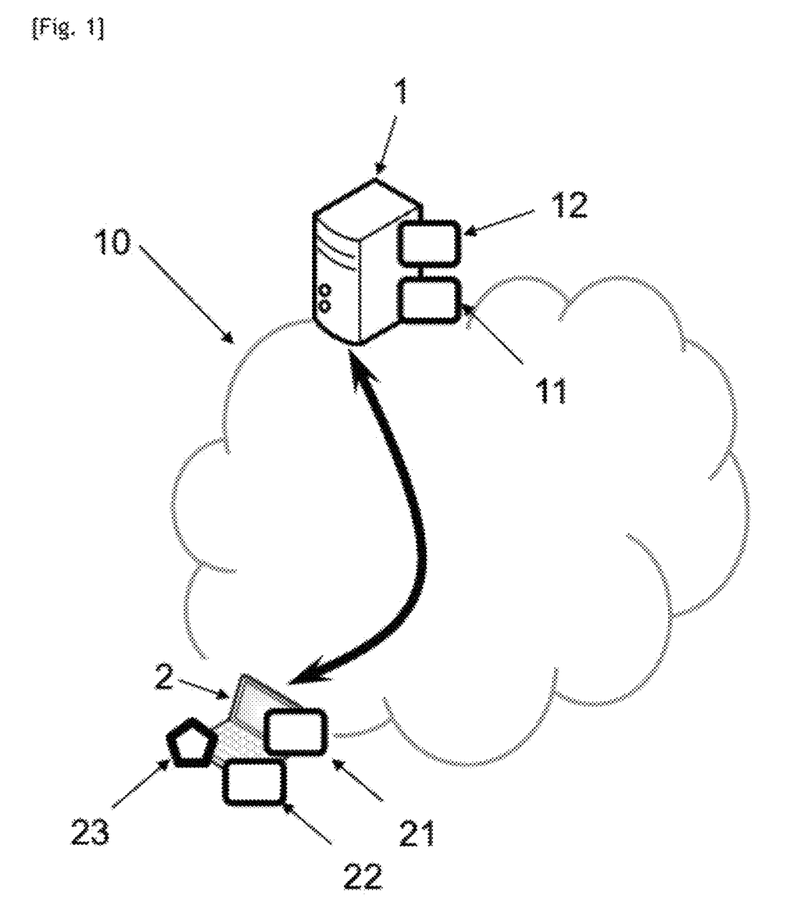
FIG. 1 is a diagram of an architecture for implementing the method according to the invention.

The present methods are implemented within an architecture such as shown in FIG. 1, thanks to a server 1 and a client 2. The server 1 is the learning device (implementing the learning method) and the client 2 is a device for extracting a feature vector (implementing the method for extracting a feature vector), for example a user's terminal. It is entirely possible that the two devices 1, 2 are the same.

In any case, each device 1, 2 is typically a remote computer equipment connected to an extended network 10 such as the Internet for the exchange of data. Each comprises data processing means 11, 21 of processor type and data storage means 12, 22 such as computer memory, for example a drive.

The server 1 stores a learning database, i.e. a set of data representative of a biometric trait associated with identities (in contrast to the data called input data, whose identity specifically is to be authenticated).

Indeed, the input or learning data are image data, and are representative of a biometric trait, in particular an iris. Conventionally, such a learning database comprises several data representative of a single biometric trait, i.e. representing the same identity, for example several occurrences of the same iris but acquired slightly differently.

Principle

The idea of the present method is to use a neural network to extract feature vectors from an image representative of an iris without needing a step of pre-processing or normalization of the input image. For this purpose, segmentation and normalization operations are integrated directly into the neural network for extracting feature vectors in the form of layers of the neural network. This approach makes it possible to benefit from the considerable improvement in performance when the iris images are previously segmented without requiring a database of images representative of manually segmented irises in order to train a neural network for semantic segmentation.

Figure 2:
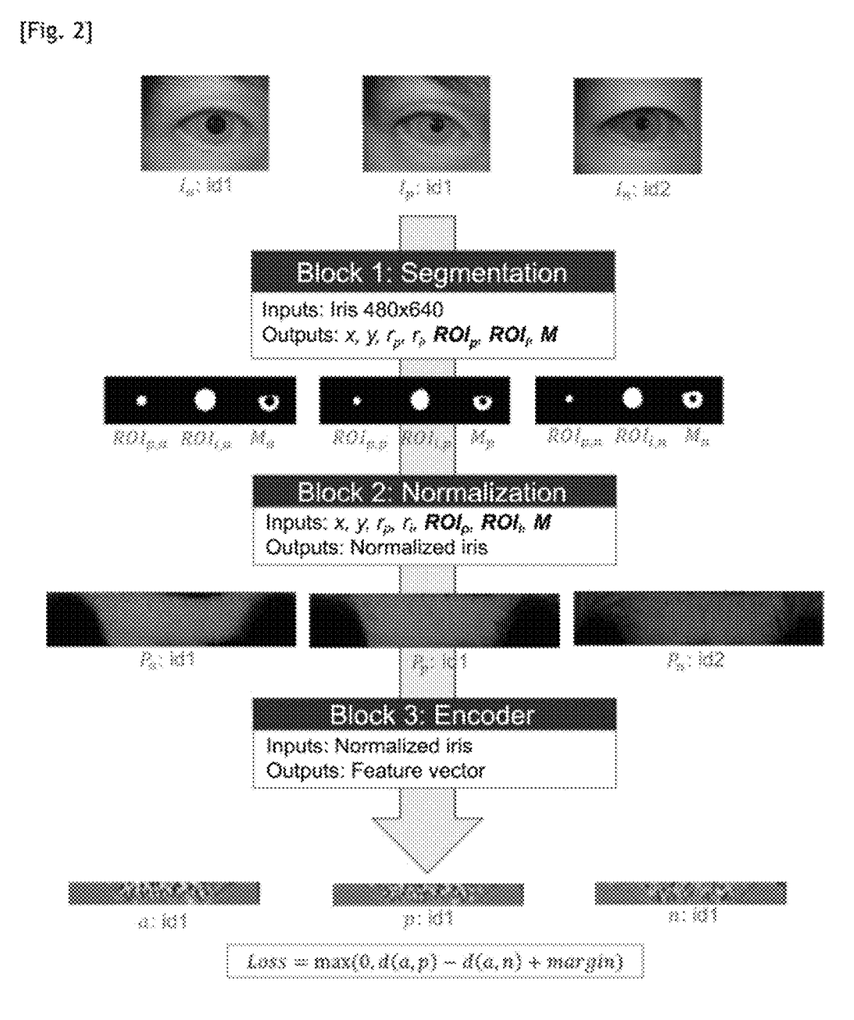
FIG. 2 shows the steps of a preferred embodiment of a method according to the invention.

The neural network is divided into three blocks as shown in FIG. 2:

Block 1: the segmentation block; it receives as input an image representative of an iris and returns as output three segmentation masks (one for the pupil, one for the iris and an attention map in which the non-useful information is masked), the coordinates of the center of the iris, the radius of the pupil;

Block 2: the normalization block; it uses the outputs of the segmentation block in order to normalize the image representative of an iris;

Block 3: the encoder block; it receives as input a normalized iris and returns as output a feature vector.

The segmentation block constitutes a first subnetwork of the neural network, and the normalization block together with the encoder block constitute a second neural network. Indeed, the normalization block does not constitute a subnetwork of the neural network in its own right to the extent that it does not comprise trainable parameters and thus can be processed as being part of the second subnetwork.

Next, to authenticate an individual, one can simply measure the distance between two vectors (for example the Euclidean distance), one of the two vectors being extracted from the image representative of the iris to be identified, the second vector being extracted from an image representative of a reference iris.

Segmentation Block

Figure 3:
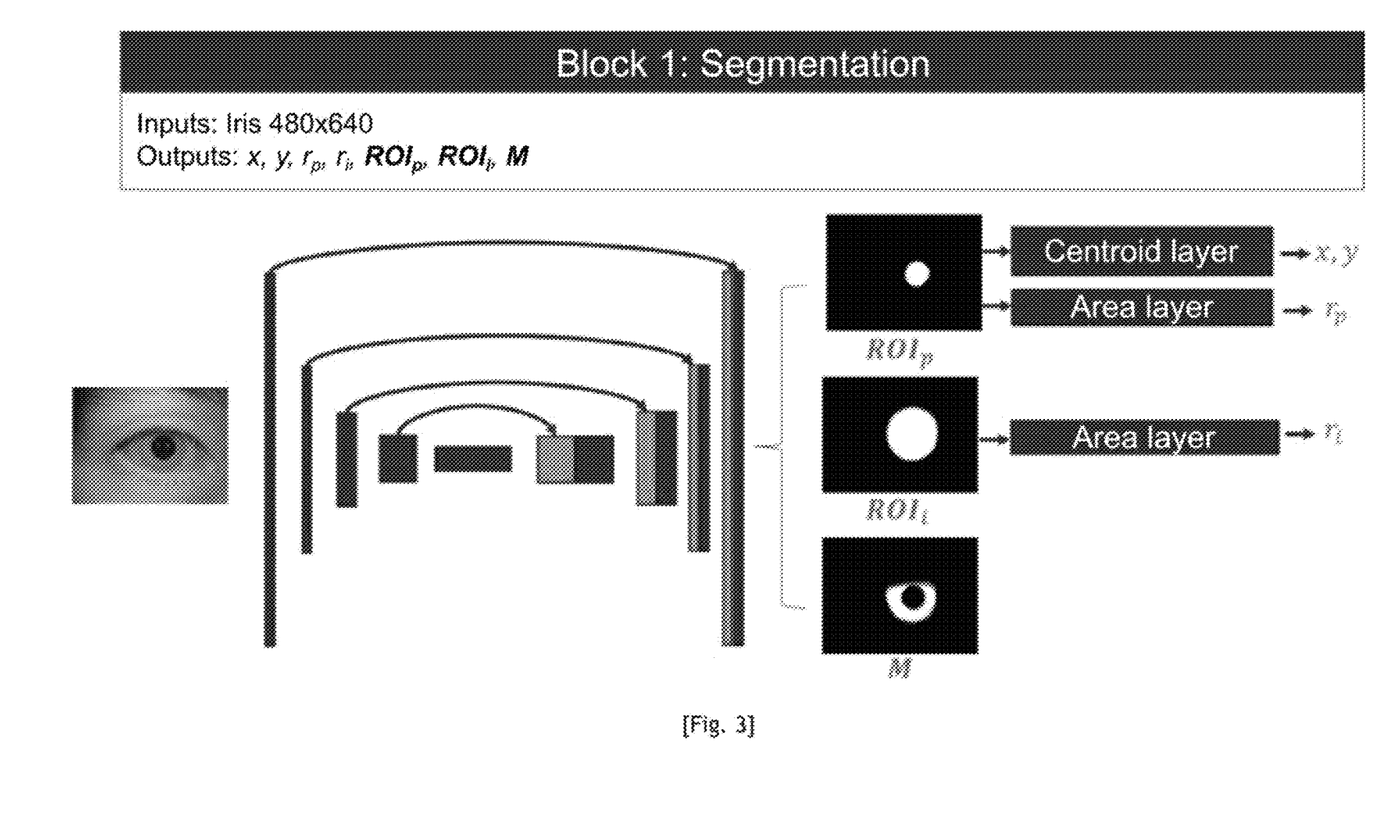
FIG. 3 shows the segmentation block in a preferred embodiment of the method according to the invention.

The first portion of the neural network is a neural network for semantic segmentation, preferably an auto-encoder convolutional neural network as described in FIG. 3. In the given example, the various layers of the neural network of the encoder portion are made up of an alternation of convolution layers and pooling layers. The decoder portion includes the following layers repeated as many times as there are pairs of a convolution layer and a pooling layer: a concatenation of the output of the layers of the encoding portion of the same size with the output of the layer preceding the concatenation layer, followed by a convolution layer and an unpooling layer.

In addition to iris segmentation, the segmentation block has additional outputs:

A pupil segmentation map, denoted:

$$ROI_p \qquad \text{[Math. 1]}$$

A segmentation map in which the iris is segmented, denoted:

$$ROI_i \qquad \text{[Math. 2]}$$

An attention map making it possible to mask the non-relevant information (eyelids, eyelashes, reflections, etc.), denoted:

$$M \qquad \text{[Math. 3]}$$

A pair of coordinates (x, y) making it possible to locate the center of the pupil by means of a so-called "centroid layer" defined as follows:

$$x = \frac{\sum_{x_i} \sum_{y_i} x_i ROI_p(xi, yi)}{\sum_{x_i} \sum_{y_i} ROI_p(xi, yi)} \qquad \text{[Math. 4]}$$

and:

$$y = \frac{\sum_{x_i} \sum_{y_i} x_i ROI_p(xi, yi)}{\sum_{x_i} \sum_{y_i} ROI_p(xi, yi)} \qquad \text{[Math. 5]}$$

The radius of the pupil, denoted:

$$r_p \qquad \text{[Math. 6]}$$

The radius of the iris, denoted:

$$r_i \qquad \text{[Math. 7]}$$

The two radii, of the pupil and the iris, are obtained thanks to a layer referred to as the "area layer" defined as follows:

$$r_{[p,i]} = \sqrt{\frac{1}{\pi} \sum_{x_i} \sum_{y_i} ROI_{[p,i]}(xi, yi)} \qquad \text{[Math. 8]}$$

The centroid and area layers are particularly advantageous for training the neural network since they have the particularity of being derivable functions, which allows gradient propagation during the training of the network by a gradient descent method.

Normalization Block

Normalization is a crucial step in the processing of images representative of an iris; it consists of transforming the iris from an annular pattern having variable dimensions to a rectangular pattern with fixed dimensions by applying a polar coordinate transformation. This transformation has many advantages; it allows compensating for pupil contractions/dilations, ensuring that all iris images presented to the encoder block have the same dimensions, and counterbalancing shape defects that may be due to a variation in the orientation of the image-collection device relative to the iris.

Figure 4:
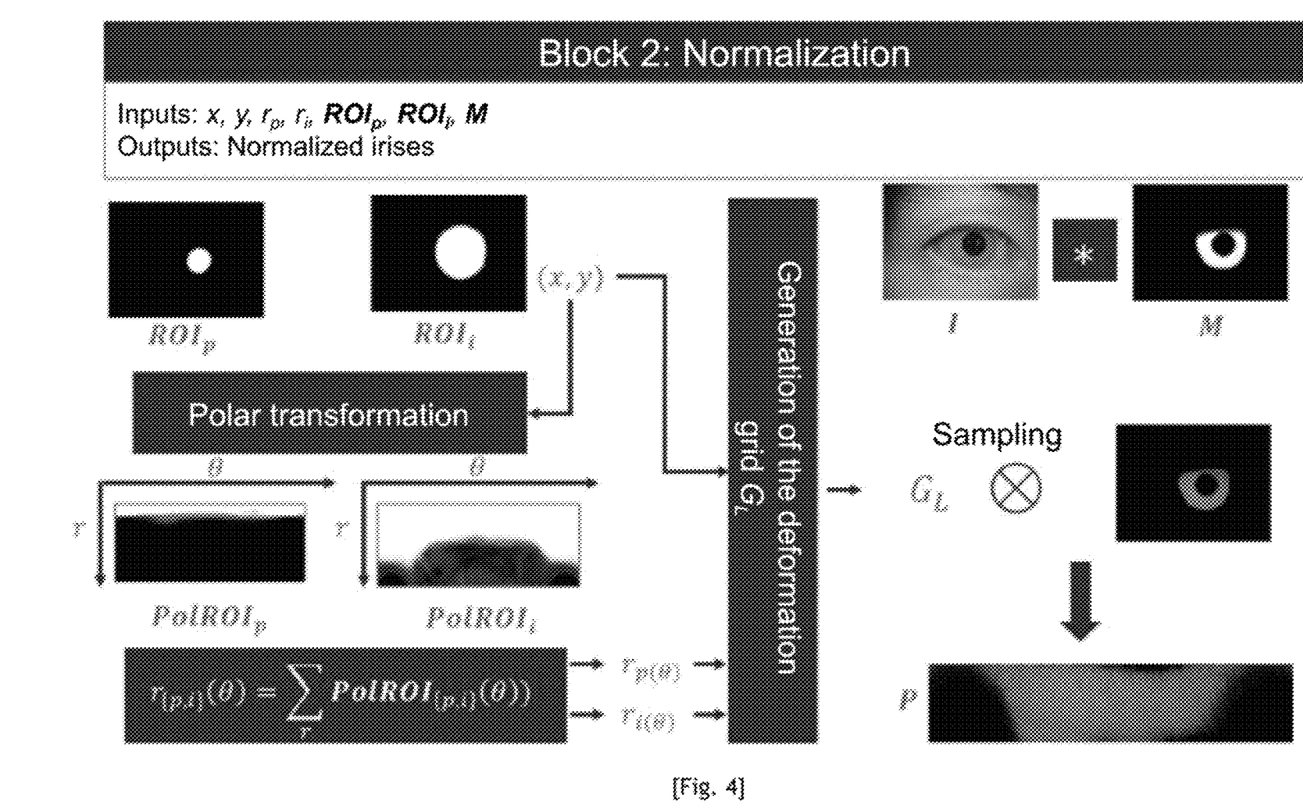
FIG. 4 shows the normalization block in a preferred embodiment of the method according to the invention.

The normalization block is not a "neural network" in the sense that it does not include trainable parameters. However, it consists of fully derivable computational layers in order to allow the propagation of the gradient from the output of the neural network to the segmentation block. This makes it possible to optimize the parameters of the segmentation block as well as the parameters of the encoder block using only an objective function ("loss") calculated on the output of the block encoder.

The normalization block as shown in FIG. 4 transforms the input image into a normalized image thanks to a sampling grid denoted:

$$G_L(\theta, r) \qquad \text{[Math. 9]}$$

where:

$$\theta \qquad \text{[Math. 10]}$$

the angle and, $$r \qquad \text{[Math. 11]}$$

the radius

The normalized image is a rectangle with the following dimensions:

$$W \times H \quad \text{[Math. 12]}$$

in which:

$$W \quad \text{[Math. 13]}$$

corresponds to the angles $$\theta, \quad \text{[Math. 14]}$$

wherein for example $$W=256, \quad \text{[Math. 15]}$$

$$H \quad \text{[Math. 16]}$$

corresponds to the radii $$r, \quad \text{[Math. 17]}$$

wherein for example $$H=64 \quad \text{[Math. 18]}$$

In order to keep only the relevant information, the image representative of the iris is previously multiplied by the attention map generated by the segmentation block.

The normalized image is then calculated according to the following formula:

$$G_L(\theta, r) = \begin{pmatrix} x_{eq}(\theta, r) \\ y_{eq}(\theta, r) \end{pmatrix} = \begin{pmatrix} r_{eq}(\theta,r)\sin(\theta_{eq}) + x \\ r_{eq}(\theta, r)\cos(\theta_{eq}) + y \end{pmatrix} \quad \text{[Math. 19]}$$

where:

$$r_{eq}(\theta, r) = r_p(\theta) + r_{eq0}(\theta, r)(r_i(\theta) - r_p(\theta)), \quad \text{[Math. 20]}$$

$$\theta_{eq} = \frac{2\pi}{W}\theta, \theta \in [0, W-1], \text{ and} \quad \text{[Math. 21]}$$

$$r_{eq0}(\theta, r) = \frac{1}{H}r, r \in [0, H-1] \quad \text{[Math. 22]}$$

In this formula the radii of the iris and the pupil are functions of the angle, which makes it possible to correct the orientation defects of the iris or any deformation of same. In this case, the radii of the iris and the pupil are defined as:

$$r_{[p,i]}(\theta) = \sum_r Pol(ROI_{[p,i]}(\theta)) \quad \text{[Math. 23]}$$

Wherein, $$Pol(\ ) \quad \text{[Math. 24]}$$

is the polar transformation.

It is also possible to use:

$$r_p(\theta)=r_p \quad \text{[Math. 25]}$$

And, $$r_i(\theta)=r_i \quad \text{[Math. 26]}$$

To obtain a simplified version of the normalized iris image.

Encoder Block

Figure 5:
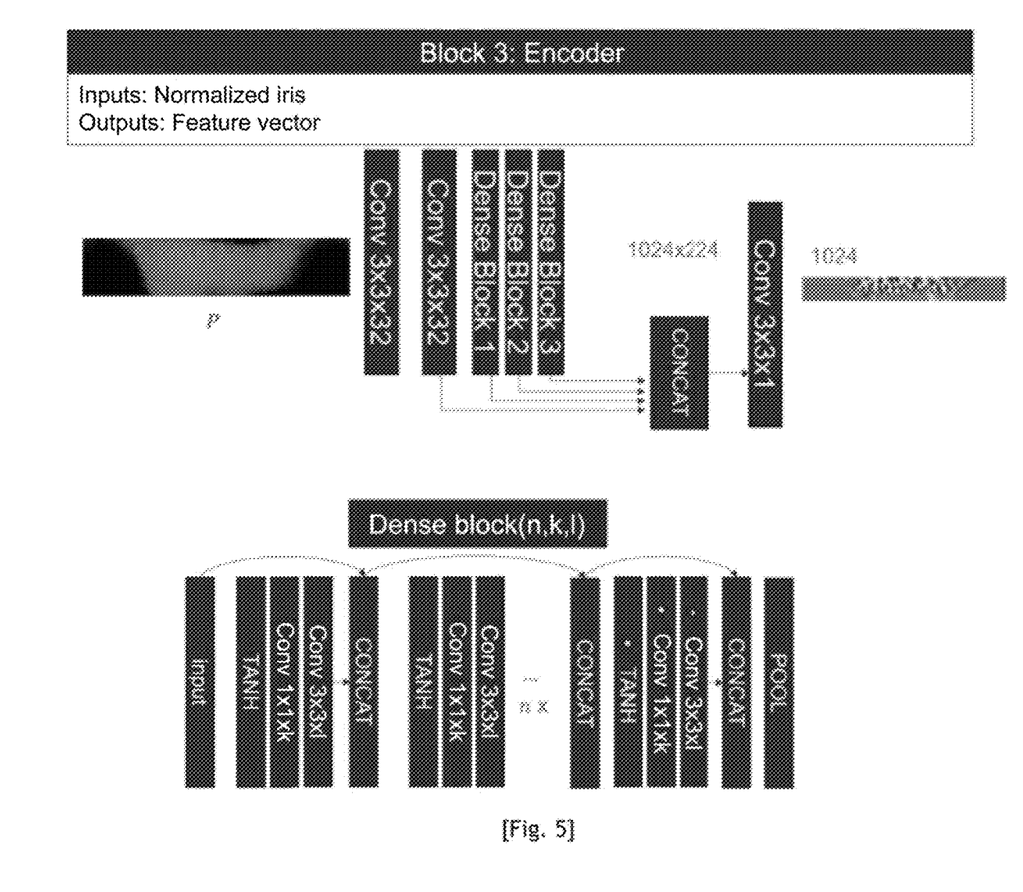
FIG. 5 shows the encoder block in a preferred embodiment of the method according to the invention.

The last block of the network is the encoder block which, from a normalized iris, forms a feature vector. This last block is made up of a set of convolution and pooling layers. It may consist of dense blocks ("dense block"), shown in FIG. 5, as described in Huang, G., Liu, Z., Van Der Maaten, L., & Weinberger, K. Q. (2017). *Densely connected convolutional networks. In Proceedings of the IEEE conference on computer vision and pattern recognition* (pp. 4700-4708). This architecture makes it possible in particular to build very deep neural networks without thereby being affected by the vanishing gradient problem thanks to the presence of residual connections.

Figure 6:
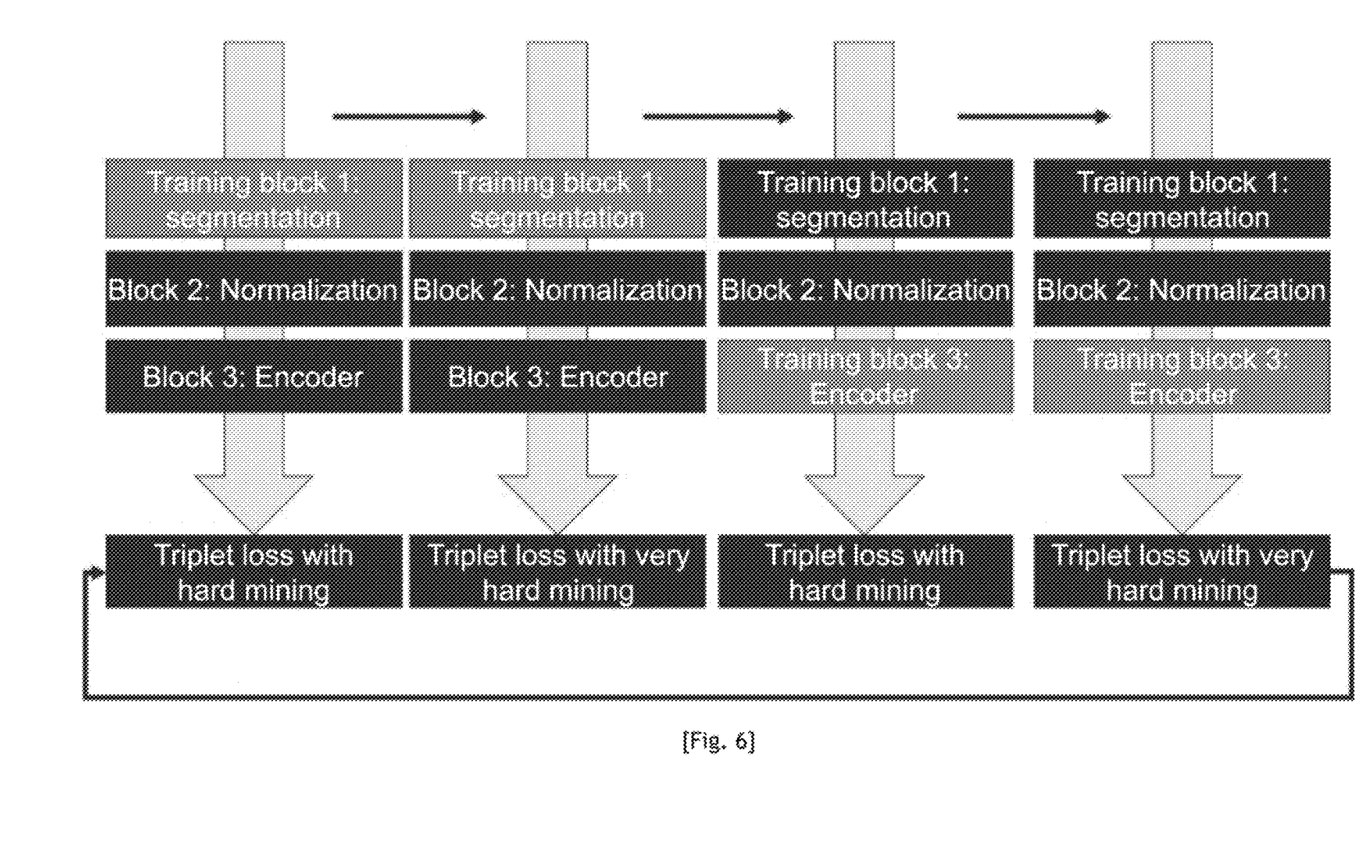
FIG. 6 shows the training of the neural network in a preferred embodiment of the method according to the invention.

It is thus possible to combine several dense blocks (for example 3) with convolution layers and a concatenation operation to extract a feature vector of the normalized iris image as shown in FIG. 6.

It is also possible to use the encoder of an auto-encoder neural network to perform the task of extracting the feature vector.

Learning Method of the Neural Network

The objective function used for training the previously described network is based on the triplet loss; it is calculated for a triplet of feature vectors. Within the triplet, a first feature vector is defined referred to as anchor $$a, \quad \text{[Math. 27]}$$

a feature vector $$p \quad \text{[Math. 28]}$$

obtained from an iris that has the same identity as the anchor and a feature vector $$n \quad \text{[Math. 29]}$$

obtained from an iris that does not have the same identity as the anchor.

For a triplet, the objective function is defined as follows:

$$\text{Loss}=\max(0,d(a,p)-d(a,n)+\gamma) \quad \text{[Math. 30]}$$

Wherein $$\gamma \quad \text{[Math. 31]}$$

is the margin, $$d \quad \text{[Math. 32]}$$

is a distance measurement (Euclidean distance, for example).

The aim is to maximize the margin between the so-called positive distance $$d(a,p) \quad \text{[Math. 33]}$$

between the anchor and the feature vector obtained from an iris that has the same identity as the anchor and the so-called "negative" distance $$d(a,n) \quad \text{[Math. 34]}$$

between the anchor and the feature vector obtained from an iris that does not have the same identity as the anchor.

This objective function is modified in order to estimate the performance of the neural network over an entire data batch (in order to be able to apply a stochastic gradient algorithm, for example SGD Moment, AdaGrad, Adam, RMSProp etc.). The batch is defined $$b$$ [Math. 35]

of size $$B=PK$$ [Math. 36]

with $$K$$ [Math. 37]

the number of images representative of an iris associated with a single identity and $$P$$ [Math. 38]

the number of different identities. The number of possible triplets is $$PK(K-1)(PK-K)$$ [Math. 39]

It is noted $$ID(a),$$ [Math. 40]

the set of size $$K$$ [Math. 41]

corresponding to the elements of the batch that have the same identity as the anchor. The document by Hermans, A., Beyer, L., & Leibe, B. (2017). In defense of the triplet loss for person re-identification. arXiv preprint arXiv: 1703.07737 describes the hard mining strategy, which only considers the $$B=PK$$ [Math. 42]

triplets, the maximum of the positive distances and the minimum of the negative distances:

$$\text{Loss} = \frac{1}{B} \sum_{a \in b} \gamma + \max_{p \in ID(a)} d(a, p) - \min_{n \in b, n \notin ID(a)} d(a, n)$$ [Math. 43]

An alternative version defines a novel strategy for calculating the objective function referred to as very hard mining. Instead of considering the average of all the anchors, this strategy considers the maximum, which corresponds to the worst triplet of the set.

$$\text{Loss} = \max_{a \in b} \left[ \gamma + \max_{p \in ID(a)} d(a, p) - \min_{n \in b, n \notin ID(a)} d(a, n) \right]$$ [Math. 44]

These two strategies can be used alternately as described in FIG. 7, by setting the parameters of one of the trainable blocks (segmentation block or encoder block) and by optimizing the parameters of the second block, and then by setting the second block and optimizing the parameters of the first block. This training method thus makes it possible to train the segmentation network without requiring the use of a database of segmented images representative of irises the training of the neural network is therefore qualified as "end-to-end" because it is not necessary to train the different parts of the neural network separately. It should be noted that this training method is made possible by the fact that the normalization block is made up only of derivable operations.

Computer Program Product

According to a second and third aspect, the invention relates to a computer program product comprising code instructions for execution (in particular on data-processing means 11, 21 of the server 1 and/or of the client 2) of a method for extracting a feature vector from an input image representative of an iris by means of a neural network, characterized in that it is trainable end-to-end, as well as storage means readable by computer equipment (memory 12, 22 of the server 1 and/or of the client 2) on which said computer program product is located.

The invention claimed is:

1. A method for extracting a feature vector from an input image representative of an iris by means of a neural network, characterized in that it can be trained end-to-end and comprises the implementation by data-processing means of a client of steps of:
   (a) Segmentation of the input image representative of the iris by means of a first subnetwork of the neural network in order to obtain an iris segmentation map, a pupil segmentation map and an attention map;
   (b) Extraction by a second subnetwork of the neural network of a feature vector from the normalized image representative of the iris segmented by a normalization operation, characterized in that it is derivable.

2. The method according to claim 1, wherein the normalization operation further comprises implementing steps of:
   Multiplying the input image representative of the iris by the attention map determined during the segmentation step, said attention map making it possible to mask the information not related to the iris in the input image representative of the iris;
   Estimating the centroid of the iris from the pupil segmentation map determined during the segmentation step;
   Estimating the radius of the iris, respectively of the pupil, from the iris segmentation map and the pupil segmentation map, respectively, determined during the segmentation step;
   Applying a polar transformation in order to represent the iris in the form of a rectangle of fixed size;
   These steps being characterized in that they can be derived mathematically.

3. The method according to claim 2, wherein estimating the centroid of the iris comprises calculating a weighted average of the values of the pixels of the pupil segmentation map in order to obtain the coordinates of the center of the iris.

4. The method according to claim 2, wherein estimating the radius of the iris, respectively of the pupil, from a segmentation map of the iris, respectively of the pupil, comprises calculating the area of the iris, respectively of the pupil.

5. The method according to claim 2, wherein the radius of the iris, respectively of the pupil, varies according to the angle and is measured on the segmentation map of the iris, respectively of the pupil, for a plurality of angles.

6. The method according to claim 1, wherein the first subnetwork is an auto-encoder network suitable for semantic segmentation.

7. The method according to claim 1, comprising a prior step (a.0) of learning, by data-processing means (11) of a server (1), from a database of learning images comprising irises associated with identities, parameters of said first and second subnetworks according to an objective function of the neural network.

8. The method according to claim 7, wherein the prior learning step comprises calculating the objective function of the neural network, said calculation of the objective function of the neural network being carried out for a batch of images representative of an iris of the learning database comprising at least two first images representative of an iris associated with a single identity as well as at least two second images representative of an iris associated with a single identity, said identity being different from the identity associated with the two first images representative of an iris, and further comprising the implementation, for each image representative of an iris of the batch, said image representative of an iris being referred to as anchor, of steps of:
  Selecting a first set of images representative of an iris comprising all the images representative of an iris of the batch associated with the same identity as that of the anchor;
  Selecting a second set of images comprising all the images representative of an iris of the batch associated with identities different from that of the anchor;
  Extracting feature vectors from each image of the two sets of images as well as from the anchor;
  Calculating a maximum distance between the feature vector extracted from the anchor and a feature vector extracted from an image representative of an iris of the first set;
  Calculating a minimum distance between the feature vector extracted from the anchor and a feature vector extracted from an image representative of an iris of the second set;
  The objective function of the neural network being dependent on the maximum value, across all the possible anchors, of the difference between the maximum calculated distance for this anchor and the minimum calculated distance for this anchor.

9. The method according to claim 8,
  wherein the prior learning step further comprises implementing steps of:
  i. Calculating a first objective function of the neural network for a batch of images representative of an iris of the learning database;
  ii. Modifying the parameters of the first subnetwork according to the first objective function of the neural network;
  iii. Calculating a second objective function of the neural network for a batch of images representative of an iris of the learning database;
  iv. Modifying the parameters of the second subnetwork according to the second objective function of the neural network;
  v. Repeating steps i. to iv. for a predetermined number of iterations.

10. The method according to claim 7, wherein the prior learning step comprises implementing steps of:
  i. Calculating a first objective function of the neural network for a batch of images representative of an iris of the learning database;
  ii. Modifying the parameters of the first subnetwork according to the first objective function of the neural network;
  iii. Calculating a second objective function of the neural network for a batch of images representative of an iris of the learning database;
  iv. Modifying the parameters of the second subnetwork according to the second objective function of the neural network;
  v. Repeating steps i. to iv. for a predetermined number of iterations.

11. The method according to claim 7, wherein the prior learning step comprises calculating the objective function of the neural network, said calculation of the objective function of the neural network being carried out for a batch of images representative of an iris of the learning database comprising at least two first images representative of an iris associated with a single identity as well as at least two second images representative of an iris associated with a single identity, said identity being different from the identity associated with the two first images representative of an iris, and further comprising the implementation, for each image representative of an iris of the batch, said image representative of an iris being referred to as anchor, of steps of:
  Selecting a first set of images representative of an iris comprising all the images representative of an iris of the batch associated with the same identity as that of the anchor;
  Selecting a second set of images comprising all the images representative of an iris of the batch associated with identities different from that of the anchor;
  Extracting feature vectors from each image of the two sets of images as well as from the anchor;
  Calculating a maximum distance between the feature vector extracted from the anchor and a feature vector extracted from an image representative of an iris of the first set;
  Calculating a minimum distance between the feature vector extracted from the anchor and a feature vector extracted from an image representative of an iris of the second set;
  The objective function of the neural network being dependent on the value of the sum, over all the possible anchors, of the difference between the maximum calculated distance for this anchor and the minimum calculated distance for this anchor.

12. The method according to claim 11,
  wherein the prior learning step further comprises implementing steps of:
  i. Calculating a first objective function of the neural network for a batch of images representative of an iris of the learning database;
  ii. Modifying the parameters of the first subnetwork according to the first objective function of the neural network;
  iii. Calculating a second objective function of the neural network for a batch of images representative of an iris of the learning database;
  iv. Modifying the parameters of the second subnetwork according to the second objective function of the neural network;
  v. Repeating steps i. to iv. for a predetermined number of iterations.

13. A non-transitory computer readable program product comprising code instructions for executing a method according to claim 1 of extracting a feature vector from an input image representative of an iris by means of an end-to-end trainable neural network, when said program is executed on a computer.

14. A non-transitory storage means readable by computer equipment on which a computer program product comprising code instructions for executing a method according to claim 1 of extracting a feature vector from an input image representative of an iris by means of an end-to-end trainable neural network, when said program is executed on a computer.

* * * * *